Nov. 23, 1965 P. HEIMLICHER ET AL 3,218,970
PRINTING CYLINDER BACKING PLATE HAVING
PRINTING PLATE TIGHTENING HOOKS
Filed June 4, 1963 2 Sheets-Sheet 1

PAUL HEIMLICHER & RENE BÜRKI,
INVENTORS,
BY Mc GLEW & TOREN,
ATTORNEYS.

PAUL HEIMLICHER & RENE BÜRKI,
INVENTORS,
BY McGLEW & TOREN,
ATTORNEYS.

United States Patent Office 3,218,970
Patented Nov. 23, 1965

3,218,970
PRINTING CYLINDER BACKING PLATE HAVING PRINTING PLATE TIGHTENING HOOKS

Paul Heimlicher, Bolligen, and René Burki, Bern, Switzerland, assignors to Winkler, Fallert & Co. Ltd., Bern, Switzerland Filed June 4, 1963, Ser. No. 285,328
Claims priority, application Sweden, June 5, 1962, 6,274/62
1 Claim. (Cl. 101—378)

This invention generally relates to rotary printing presses and is particularly concerned with a mounting arrangement for mounting printing plates on printing cylinders of rotary printing presses.

The invention has particular application to printing cylinders of rotary printing presses which originally were designed for supporting stereotypes, i.e. relatively thick printing plates, and on which it is desired to mount instead printing plates of thinner dimensions.

A large number of rotary printing machines having cylinders originally designed for stereotypes, are presently in existence. As is known, stereotypes are now comparatively little used except for newspaper work, and it is therefore desired to employ such printing presses for different printing jobs in which much thinner printing plates are mounted on the printing cylinders. It is well known that the mounting of thin printing plates on printing rollers originally designed for stereotypes entails considerable difficulties. The prior art devices suggested for the mounting of thin printing plates on printing cylinders originally intended for thicker printing plates, such as stereotypes, renders adjustment and registering of the printing plates and removal of the printing plates from the cylinders very difficult.

As is known in this art, if a printing cylinder of the kind indicated is to be mounted with a thin printing plate instead of with a stereotype, it is necessary to use a backing plate or support, the thickness of the thin printing plate and the backing plate jointly corresponding to the thickness of a stereotype. Such thin printing plates cannot be mounted on the cylinders by clamping or the like means which cause attachment of the printing plates through pressure against the plate edges, as such pressure results in buckling and knuckling of the thin plates.

It has previously been suggested to secure the thin printing plates on the backing plates by adhesion. The structure thus obtained and consisting of the printing plate glued onto the backing plate is then mounted on the printing cylinders in the same manner as stereotypes. In this way, either stereotypes or thinner printing plates can be used. This arrangement, however, is very disadvantageous because the adhesive connection of the printing plate on a backing plate prevents registering and adjustment from below the printing plate since repeated removal of the printing plate from the backing plate tends to damage the printing plate and to bend it in an undesired manner. Therefore, any subsequent adjustment of the printing plate for the purpose of registry can only be effected jointly with the backing plate, provided the printing cylinder of the rotary printing press is equipped with the necessary adjusting means which, incidentally, are relatively expensive.

According to a different suggestion, thin printing plates are mounted on the printing cylinders by magnetic forces or by applying a vacuum. This, however, requires printing cylinders which, from the very outset, are constructed in conformity with a predetermined plate thickness. For this reason, such cylinders can be mounted either with stereotypes or with thin printing plates, but not with both.

Due to the increasing use of very thin printing plates and the existence of a large number of rotary printing presses having printing cylinders originally adapted for thick stereotypes, a great need exists for providing an arrangement wherein such printing cylinders may be readily fitted either with thin printing plates for stereotypes.

Accordingly, it is a primary object of this invention to provide a mounting arrangement for printing cylinders of rotary printing presses which enables the selective mounting of either thin printing plates or thicker stereotypes.

Another object of this invention is to provide a mounting arrangement for mounting printing plates on printing cylinders which is of simple and rugged design and which permits adjustment of the printing plates relative to the printing cylinders and removal therefrom in a simple and rapid manner.

Generally, it is an object of this invention to improve on the art of mounting printing plates on printing cylinders as presently practiced.

Briefly, and in accordance with this invention, thin printing plates to be mounted on printing cylinders are provided at their two transverse edge regions with recesses or cutouts for the engagement of hooks which project approximately to the surface of the printing plate. The hooks which engage in the recesses at one end of the printing plate may be stationarily mounted while the hooks engaging in the openings at the opposite end are adjustable so as to render possible proper positioning and adjustment of the printing plates on the cylinders. However, it is feasible to make both sets of hooks adjustable.

The various features of novelty which characterize the invention are pointed out with particularity in the claim annexed to and forming a part of this specification. For a better understanding of the invention, its operating parts and specific advantages attained by its use, reference should be had to the accompanying drawings and descriptive matter in which there are illustrated preferred embodiments of the invention.

Figure 1:
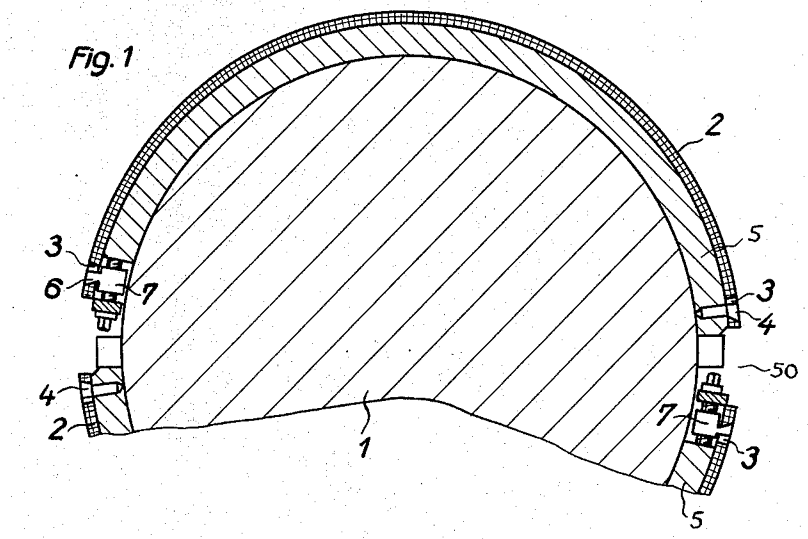
FIG. 1 is a fragmentary sectional view through a printing cylinder having two printing plates with backing plates mounted thereon by the inventive mounting arrangement.
Figure 2:
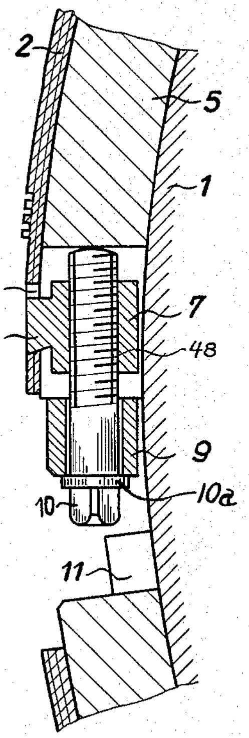
FIG. 2 is a fragmentary section through the adjustable mounting elements on an enlarged scale, shown in position for mounting a printing plate on a printing cylinder.
Figure 3:
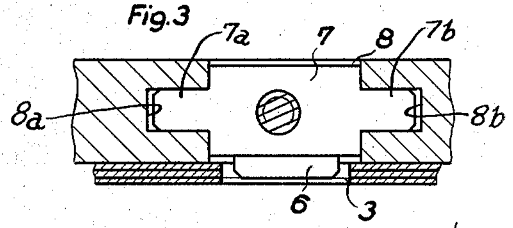
FIG. 3 is a fragmentary section through the adjustable mounting elements.

Referring now to the drawings, and in particular to the embodiment of FIGS. 1–4, it will be noted that the printing cylinder proper is indicated by reference numeral 1. Stereotypes or thin printing plates 2 jointly with a backing plate 5 may optionally be mounted on the cylinder 1. In the embodiment shown, two printing plates 2 with their backing plates 5 are mounted on respective halves of the printing cylinder 1 with an access area 50 between them. The thin printing plates 2 are provided at their respective opposite straight transverse edge portions with a number of spaced recesses or cutouts 3. Hook members 4 are stationarily positioned within the backing plate 5 and project into the cutouts 3 at one transverse edge area of the printing plate. It will be noted that the hook members do not project beyond the surface of the plates 2 but they are located within the space defined by the cutouts and engage the walls defining the cutouts.

The cutouts 3 at the opposite transverse region of the printing plate 2 are engaged by hook members 6 which are integral with slide members 7. Each slide member 7 is movably mounted within a substantially rectangular recess 8 having lateral guide cavities 8*a* and 8*b* defined in the backing plate 5. The recess 8 with guide cavities 8*a* and 8*b* are cut inwardly from at least one location along the straight edges of the backing plate 5 (see FIG. 3).

The arrangement also includes a stationary bushing member 9 carried by the backing plate 5 which receives a set screw 10 which is screwed into a threaded bore 48 of the slide member 7. The free end of the set screw 10 includes a collar 10*a* which bears against the bushing 9 carried by backing plate 5 so that upon turning of the set screw 10 the slide member 7, and thus the hooks 6, are moved axially along the set screws in the recess 8 with side wings 7*a* and 7*b* guided in the respective guide cavities 8*a* and 8*b*. In this manner, the position of the hooks 6 relative to the openings 3 can be properly adjusted and fixed. Thus, the set screws 10 will be turned until the hooks 6 engage the walls defining the cutouts 3 with the desired tightness. If adjustment or registry is desired, the set screws may be loosened to permit slight adjustment of the printing plates. As the openings 3 are larger than the hooks 4 and 6, respectively, lateral adjustment can, of course, be easily effected.

The printing plates 2 may be mounted on the printing cylinder 1 jointly with the backing plate 5.

If guide grooves 8 are cut in both straight edges of the backing plate 5 and slide members 7 with hooks 6 and set screws 10 are inserted into these grooves, registering of the printing plates in a circumferential direction is, of course, greatly facilitated.

Figure 4:
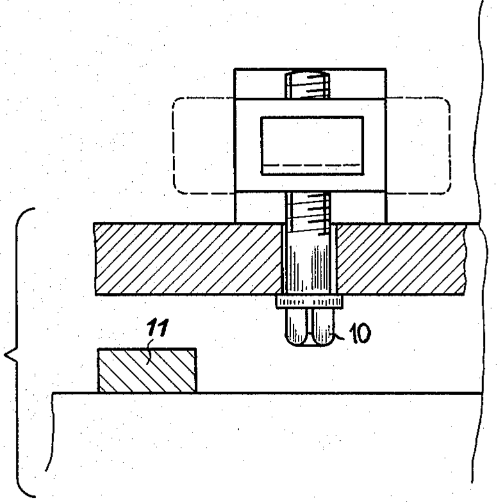
FIG. 4 is a fragmentary plan view on the adjustable mounting elements.
Figures 5, 6, 7, 8:
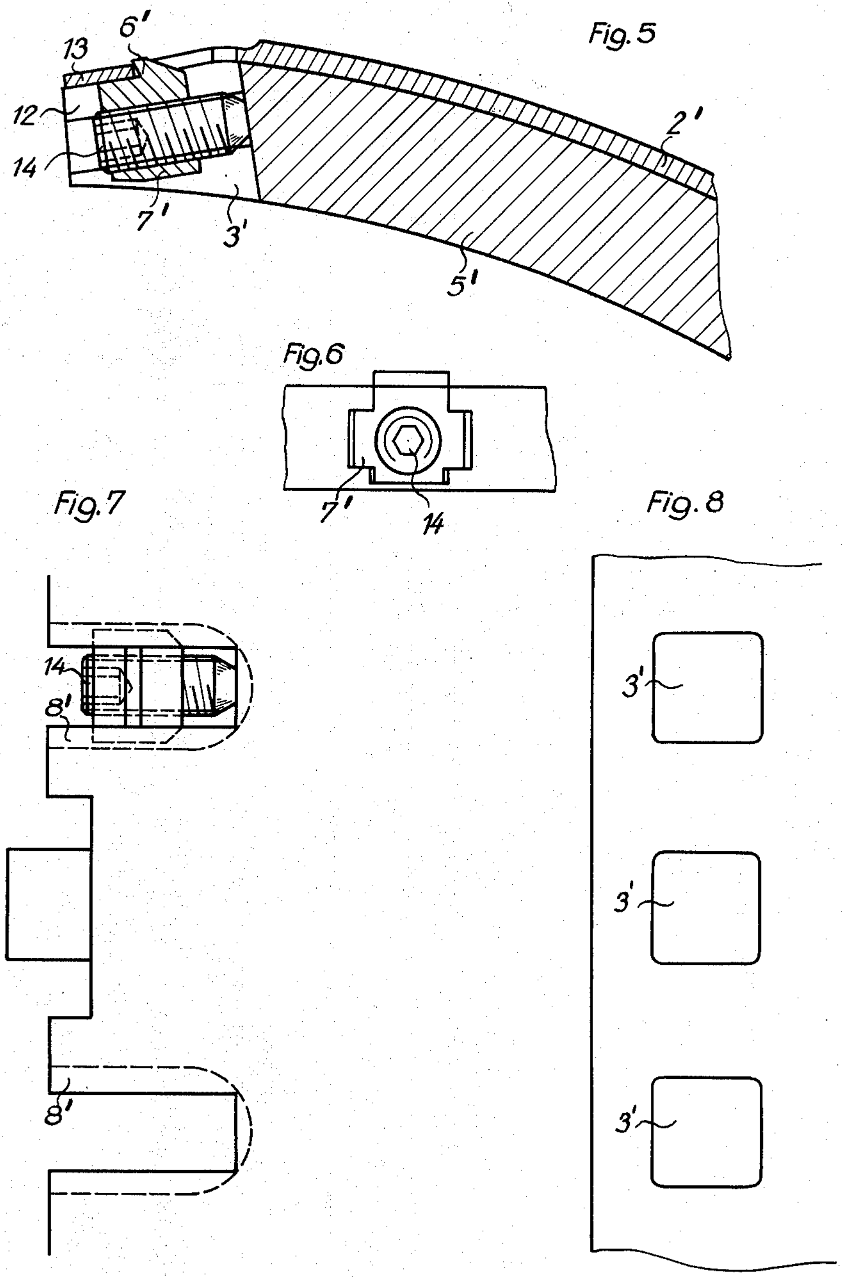
FIG. 5 is a fragmentary section through a different embodiment, wherein the ends of the backing plate are inclined and the printing plate is correspondingly bent.
FIG. 6 is a fragmentary side elevation of the backing plate with the mounting element in position.
FIG. 7 is a plan view showing one end of the plate fitted with a mounting element.
FIG. 8 is a plan view illustrating one transverse edge portion of a printing plate.

The plan view of FIG. 4 illustrates the position of the adjustable mounting elements relative to the customary abutments 11 on the printing cylinder 1.

It will be realized that the invention is not limited to the provisions of set screws 10, but proper tensioning of the printing plates 2 can also be obtained by suitably arranged springs.

Turning now to the embodiment of FIGS. 5–8, this embodiment is particularly suitable for the mounting of extremely thin printing plates. In mounting very thin printing plates, care must be taken to avoid a printing impression of the ends of the printing plate and of the hooks which engage in the openings of the plate. With a view to eliminating this potential danger, the embodiment of FIGS. 5–8 illustrates an arrangement wherein the backing plate at the access area includes a slanted or inclined portion 12. In this manner it is accomplished that the edge portions of the printing plate, which carry the openings, are bent and thus displaced further away from the circumferential printing plane of the printing cylinder. Thus viewing the embodiment of FIGS. 5–8, it will be noted that the portion 12 of the backing plate 5' includes an angle with the remainder of the backing plate. The marginal or end portion 13 of the printing plate 2' is correspondingly bent downwardly toward the longitudinal axis of the printing cylinder. The displaceable slide members 7' with their hook portions 6' are again mounted in guide grooves 8'. Adjustment of the hooks 6' is accomplished by the set screw 14 as in the previous embodiment. The bushing member 9 is secured to backing plate 5.

While specific embodiments of the invention have been shown and described in detail to illustrate the application of the principles of the invention, it will be understood that the invention may be embodied otherwise without departing from such principles.

What is claimed is:

A mounting device for thin printing plates, comprising a curved backing plate, a first hook member secured to said backing plate adjacent its one end and having a hook portion extending outwardly from the surface thereof, a relatively thin printing plate having a cut-out adjacent its one end into which said hook portion extends, said printing plate having a cut-out adjacent its opposite end, a stationary bushing carried by said backing plate and extending along an edge thereof at an end thereof opposite from the end having said first hook member, said backing plate having a central recess and a lateral guide cavity on each side of the recess, the said recess and said lateral cavities extending inwardly from said stationary bushing in a direction toward said first hook member, a sceond hook member slidable in the recess of said backing plate and having a lateral wing portion slidable in each of said lateral guide cavities, said second hook member having a projecting hook portion engaged in the cut-out of the opposite end of said thin printing plate, said first and said second hook member hook portions being dimensioned so that they do not extend beyond the surface of said thin printing plate, and a set screw being freely rotatable in said stationary bushing and threadably engaging said second hook member for displacing said hook member in said recess and bearing against said bushing in a direction toward said recess, sadi screw being rotatable to advance said second hook and to cause said screw to bear against said bushing and to tighten said printing plate circumferentially on said backing plate.

References Cited by the Examiner

UNITED STATES PATENTS

| | | | |
|---|---|---|---|
| 1,096,982 | 5/1914 | Wood | 101—378 |
| 1,220,668 | 3/1917 | Meisel | 101—415.1 |
| 1,658,034 | 2/1928 | Crafts | 101—386 |
| 2,543,255 | 2/1951 | Parrish | 101—378 |
| 2,706,947 | 4/1955 | Albrecht | 101—415.1 |
| 2,736,259 | 2/1956 | Sather | 101—378 |

FOREIGN PATENTS

| | | |
|---|---|---|
| 817,441 | 7/1959 | Great Britain. |

ROBERT E. PULFREY, *Primary Examiner.*

EUGENE R. CAPOZIO, *Examiner.*